(12) United States Patent
Imai et al.

(10) Patent No.: US 8,006,856 B2
(45) Date of Patent: Aug. 30, 2011

(54) SEAL RING FOR PLUG

(75) Inventors: Hiroshi Imai, Gyoda (JP); Koichi Abe, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 1022 days.

(21) Appl. No.: 11/629,079

(22) PCT Filed: Jun. 6, 2005

(86) PCT No.: PCT/JP2005/010364
§ 371 (c)(1),
(2), (4) Date: Dec. 11, 2006

(87) PCT Pub. No.: WO2005/121612
PCT Pub. Date: Dec. 22, 2005

(65) Prior Publication Data
US 2008/0290612 A1  Nov. 27, 2008

(30) Foreign Application Priority Data
Jun. 11, 2004  (JP) .................................. 2004-174384

(51) Int. Cl.
*B65D 51/18* (2006.01)

(52) U.S. Cl. ...................... 220/254.1; 220/233; 277/650
(58) Field of Classification Search .................. 220/233, 220/254.1; 277/650
See application file for complete search history.

(56) References Cited

U.S. PATENT DOCUMENTS
7,073,678 B1 * 7/2006 Dibdin et al. .............. 220/254.1
* cited by examiner

*Primary Examiner* — Anthony Stashick
*Assistant Examiner* — Elizabeth Volz
(74) *Attorney, Agent, or Firm* — Browdy and Neimark, PLLC

(57) ABSTRACT

The object is to provide a seal ring for a plug, which, when used in a plug cap, can be used regardless of kind of chemical liquid and has no possibility of damaging a seal surface of the plug in tightening the plug cap. The seal ring is placed in the plug cap installed on the plug having a liquid path and/or a gas path, and the seal ring achieves liquid sealing and/or gas sealing of the plug. The seal ring (1) has on its upper surface an edge seal section (17), on its inner surface a surface seal section (18), and on its outer surface a projection section (19) engaging with a ring engagement section (16*a*) formed on the inner surface of the plug cap.

9 Claims, 6 Drawing Sheets

SEAL RING FOR PLUG

TECHNICAL FIELD

The present invention relates to a seal ring for a plug, and more particularly to a seal ring for a plug used for delivery of a liquid or a gas, wherein: the plug is mounted on a tank in which is contained the liquid for example such as semiconductor high-purity chemicals, ordinary chemicals or the like; and, the plug is covered with a plug cap in which the seal ring is mounted to achieve liquid seal or gas seal of the plug.

BACKGROUND ART

Semiconductor high-purity chemicals and ordinary chemicals are stored in a tank good in resistance to these chemicals. Hitherto it has been known in the art that: formed in general in this tank 70 are two pieces of mouth stopper sections 71 and 71a; and, plugs 72 and 72a are mounted on these mouth stopper sections 71 and 71a, respectively, wherein each of the plugs 72 and 72a is provided with its corresponding plug section not shown in the drawings (FIG. 8). These plugs 72 and 72a function as lids for closing the mouth stopper sections 71 and 71a, respectively. Of these plugs 72 and 72a: one serves as a liquid path connecting piece 72; and, the other serves as a gas path connecting piece 72a. Connected with the liquid path connecting piece 72 is a siphon tube 73 which reaches an area in the vicinity of a bottom section of the tank 70.

In retrieving the liquid stored in this tank 70, first of all, plug caps having been mounted on the plug sections of the plugs 72, 72a provided in the mouth stopper sections 71, 71a in the tank 70 are removed. After that, each of sockets 75, 75a having been connected with a hose 74 is connected with each of the plug sections of these plugs 72, so that the liquid contained in the tank 70 is retrieved and supplied to the hose 74 through the siphon tube 73 by using a pump P. At this time, in order to prevent the interior of the tank 70 from falling in negative in pressure, an inert gas is supplied to the tank 70 from a hose 74a having been connected with the plug section of the other plug 72a.

Hitherto the applicant of the present invention has proposed a connector (a type of which is one shown in FIG. 1 in Japanese Patent application Laid-Open No.: 2004-163395 gazette), wherein the applicant of the present invention has proposed the connector to be attached to a liquid tank by compactly integrate two types of plugs. The connector is characterized in that: the connector is constructed of a plug fixedly mounted on the tank and a socket connected with the plug; the plug is provided with a liquid path and a gas path; and, the socket is provided with a liquid path communicated with the liquid path and also provided with a liquid path connecting piece communicated with the liquid path, and further provided with a gas path communicated with the gas path and also provided with a gas path connecting piece communicated with the gas path.

In either of the above-mentioned types, the plug cap may be fitted to the plug section of the plug. Thus, the liquid path and the gas path each having been formed in the plug section by means of the plug cap are blocked. Under such blocked condition, transportation and reservation thereof may be made.

In the above transportation and reservation of the tank, in order to prevent the chemical liquid or gas in the tank 70 from leaking out thereof, a seal ring is used in a peripheral surface or a ceiling surface in the interior of the plug cap and brought into intimate contact with such peripheral surface or ceiling surface. Thus, the liquid path or gas path of the plug is sealed up. As such a seal ring, an O-ring is generally used.

Patent document 1: Japanese Patent application Laid-Open No.: 2002-114242 gazette;
Patent document 2: Japanese Patent application Laid-Open No.: 2002-54782 gazette; and
Patent document 3: Japanese Patent application Laid-Open No.: 2003-163395 gazette.

DISCLOSURE OF THE INVENTION

Problems to be Solved by the Invention

As described above, in the conventional plug cap, there is disposed an O-ring for preventing the liquid or gas from leaking out of the tank. In this case, it is cumbersome for a use to select the O-ring in its material according to different kinds of chemical liquids stored in the tank. Further, there is a fear that the chemical liquid is contaminated with some type of O-ring. In addition, since the plug cap is fastened to the plug in operation, the O-ring having been fixedly mounted on the side of the plug cap is brought into harsh slide-contact with an outer peripheral surface of the plug. Therefore, there is a fear that such harsh side-contact damages the plug in its seal surface.

As described above, in the case of the plug cap provided with the conventional seal ring: it is cumbersome for the user to select the seal ring in its material; and, in addition to this disadvantage, there arises another problem that the seal surface of the plug damages easily. Consequently, it is an object of the present invention to provide a seal ring for a plug free from the above-mentioned problems. In other words, in case that the seal ring of the present invention for the plug is disposed inside the plug cap, it is possible to use the seal ring regardless of kind of chemical liquid and without any fear that a seal surface of the plug is damaged when the plug cap is fastened.

Means for Solving the Problems

A seal ring of the present invention for a plug is used to solve the problems described above, and is characterized in that the seal ring: is disposed inside a plug cap which covers a plug, wherein the plug is provided with a liquid path and/or a gas path; achieves liquid sealing and/or gas sealing of the plug; and, is provided with an edge seal section in its upper surface, a surface seal section in its inner surface, and a projection section in its outer surface, wherein the projection section is engaged with a ring engagement section formed in an inner surface of the plug cap.

Further, a seal ring of the present invention for a plug is used to solve the problems described above, and is characterized in that the seal ring: is disposed inside a plug cap which covers a plug, wherein the plug is provided with a liquid path and/or a gas path; achieves liquid sealing and/or gas sealing of the plug; and, is provided with a surface seal section in its inner side surface, and a projection section in its outer side surface, wherein the projection section is engaged with a ring engagement section formed in an inner surface of the plug cap.

A seal ring of the present invention for a plug is used to solve the problems described above, and is characterized in that the seal ring is disposed inside a plug cap which covers a plug, the plug being provided with a liquid path and/or a gas path, wherein the seal ring: achieves liquid sealing and/or gas sealing of the plug; is provided with a first edge section, which abuts against an edge seal surface of a ring engagement section formed inside the plug cap; and, is also provided with a second edge section which abuts against a seal surface of the plug, wherein the second section is lager in number than the first section.

Effect of the Invention

The seal ring has its friction resistance: relatively increased with regard to a plug tube which is brought into area contact with a surface seal section of the seal ring when a plug cap is threadably engaged with the plug tub; and, relatively decreased with regard to the plug cap which abuts against the seal ring in each of an edge section, a projection section and an outer peripheral surface of the seal ring. As a result, the seal ring is substantially fixedly mounted on the side of the plug. Consequently, there is no fear that the plug tube is damaged when threadably engaged with the plug cap.

BEST MODE FOR CARRYING OUT THE INVENTION

Preferred embodiments for carrying out the present invention will be described with reference to the accompanying drawings. FIG. 1 is a view illustrating an example of each of: a plug cap 2 provided with the seal ring 1 of the present for the plug; and, a plug covered with this plug cap 2. In this case, the plug is provided with: a male screw section 4 in its upper section, which screw section 4 is threadably engaged with a mouth stopper section of an upper section of a tank; and, a siphon tube 5 in a central section of its bottom surface, which siphon tube 5 extends downward, wherein the plug is formed into a cup-like body 3. The siphon tube 5 may be integrally formed with the body 3. Alternatively, the siphon tube 5 may be separately formed and then welded to the body 3. When the plug described above is mounted on the tank, the siphon tube 5 reaches a range in the vicinity of the bottom of the tank in length.

A plug sleeve or tube 6 is vertically provided in an inner bottom section 7 of the body 3. The plug tube 6 is formed into a cylindrical shape provided with a through hole 8 which communicates with the siphon tube 5. Formed in an outer peripheral surface of an intermediate section of the plug tube 6 are an annular engagement concave section 9 and an annular convex section 10. Formed in an outer peripheral surface of a lower section of the plug tube 6 is a male screw 11. Fitted into the engagement concave section 9 is a locking ball (not shown) of a socket which is to be connected with the plug 1, so that the socket is locked to the plug. A single or a plurality of gas paths 12 are formed through a wall section of the plug tube 6 so as to extend vertically through the wall section. Any one of the gas paths 12 reaches a bottom section of the body 3 to open there. Each of the gas paths 12 has its upper end opened into a side surface of an upper section of the plug tube 6.

The plug cap 2 is one which covers the plug tube 6 when the socket described above is not connected. By means of this, the plug tube 6 is protected from dust and dirt. A female screw 13 is formed in an inner peripheral surface of a lower section of the plug cap 2, and threadably engaged with the male screw section 11 of the plug tube 6, thereby allowing the plug cap 2 to be mounted on the plug tube 6. An appropriate air vent or hole 14 is formed in a side surface of the plug cap 2.

Installed in the plug cap 2 in a peripheral surface and a ceiling surface in its inner surface is a seal ring 1, which is brought into intimate contact with an outer peripheral surface of a top surface of the plug tube 6 to achieve liquid sealing or gas sealing. The seal ring 1 is fitted to a ring engagement section 15, which is formed in an inner side surface or a ceiling surface of the plug cap 2.

The ring engagement section 15 is positioned in a deep inner section of the plug cap 2, and provided with: an edge seal surface 16 for urging an upper surface of the seal ring 1; and, an engagement groove 16a, which is positioned in the side of an opening of the plug cap 2 to engage with and hold the seal ring 1 there (see FIG. 2).

The seal ring 1 is provided with: an edge seal section 17 in its upper surface, wherein the edge seal section 17 abuts against the edge seal surface 16; a surface seal section 18 in its inner side surface, wherein the surface seal section 18 is brought into area contact with the plug tube 6; and, a projection section 19 in a lower section its outer surface, wherein the projection section 19 extends outward and engages with the engagement section 16a (see FIG. 2). A ring outer peripheral surface 1a of the seal ring 1, which surface 1a is positioned above the projection section 19, is brought into light slidable contact with a plug inner peripheral surface 2a of the plug cap 2, wherein the inner peripheral surface 2a is oppositely disposed from the ring outer peripheral surface 1a. Alternatively, it is possible to design these peripheral surfaces 2a, 1a so as to provide a slight gap between the plug inner peripheral surface 2a and the ring outer peripheral surface 1a.

In this way in the construction mentioned above, the seal ring 1 is fitted to the interior of the plug cap 2. Consequently, the seal ring 1 is brought into area contact with the plug tube 6 through the surface seal section 18 when the plug cap 2 is threadably engaged with the plug tube 6, so that the seal ring 1 has its frictional resistance to the plug tube 6 slightly increased. With respect to the plug cap 2 which abuts against the seal ring 1 through its edge seal section 17, projection section 19 and through its ring outer peripheral surface 1a, the seal ring 1 has its frictional resistance relatively decreased. As a result, the seal ring 1 is substantially fixed to the side of the plug tube 6. Due to this, there is no fear that the plug tube 6 is damaged when the plug cap 2 is threadably engaged with the plug tube 6.

Various modes of the seal ring 1 will be described hereinbelow with reference to the accompanying drawings.

An embodiment shown in FIGS. 1 and 2 has a construction in which: the edge seal section 17 assumes a triangular shape in cross section, and is brought into line-contact with the edge seal surface 16 of the ring engagement section 15; and, the surface seal section 18, which is a curved surface(or fan-shaped surface) in cross section, extends stepwise inward and is brought into area contact with the seal surface in the peripheral surface of the plug tube 6.

The seal ring 1 enters the interior of the plug cap 2 from the side of its opening. In this entrance, since an outer diameter of the projection section 19 of the seal ring 1 is larger than an inner diameter of the plug cap 2, it is necessary for the user to push the seal ring 1 into the plug cap 2 with his or her effort. When the projection section 19 reaches the engagement groove 16a, the seal ring 1 is released from its contracted state to return to its initial state, so that the seal ring 1 expands outward inside the engagement groove 16a. As a result, the seal ring 1 is held in the engagement groove 16a and prevented thereby from dropping out of the plug cap 2.

The seal ring 1 thus fitted as described above has a ridgeline of its edge seal section 17 brought into light line-contact with the edge seal surface 16. At this time, the projection section 19 is slidably held in the engagement groove 16 (FIG. 2(A)). Further, the ring outer peripheral surface 1a makes non-contact or slight contact with the plug inner peripheral surface 2a.

Since each of the relationship between the projection section 19 and the engagement groove 16a and the relationship between the ring outer peripheral surface 1*a* and the plug inner peripheral surface 6*a* is common with those found in other embodiments which will be described later, a description of such common relationship will be omitted in the embodiments subsequent to the embodiment having already described in the above.

when the plug cap 2 is threadably engaged with the plug tube 6 and then gradually fastened thereto, the surface seal section 18 abuts on a curved surface section 6*a* in an upper surface peripheral edge of the plug tube 6 (FIG. 2(B)). Then, when the plug cap 2 is further fastened, the surface seal section 18 is contracted by the outer peripheral surface of the plug tube 6, so that the surface seal section 18 is flattened in shape to have its portion escaped upward, thereby allowing the seal ring 1 to achieve strain sealing in the above abutting sections (FIG. 2(C)).

Under such circumstances: the seal surface section 18 is widely brought into area contact with the outer peripheral surface of the plug tube 6 to increase its frictional resistance to the plug tube 6. On the other hand, the edge seal section 17 keeps its line-contact with the edge seal section 16, and is therefore very small in frictional resistance. Consequently, when the plug cap 2 is further fastened in this state, the seal ring 1 is substantially fixed to the plug tube 6 which is larger in frictional resistance. As a result, the seal ring 1 fails in motion to follow the plug cap 2 which is small in frictional resistance. Due to this, there is no fear that the outer peripheral surface of the plug tube 6 is damaged by the seal ring 1.

Upon completion of this fastening operation of the plug cap 2 to the plug tube 6, the surface seal section 18 reaches a tapered surface 10*a* of the engagement convex section 10, wherein the seal section 18 is departed from a vertical outer peripheral surface of the plug tube 6 to reach the tapered surface 10*a* and is deformed upward under stress to exert a sealing force on the plug tube 6 (FIG. 2(D)). At this time, the edge seal section 17 is urged by the edge seal section 16 to deform, which makes it possible to realize the area contact of the seal ring 1 with the plug tube 6, so that sections under such area contact are sealed.

An embodiment shown in FIG. 3 is a modification of the first embodiment. In this modification: additionally provided is a lower surface edge section 21 positioned in a lower side of the surface seal section 18, wherein both the edge seal section 17 and the surface seal section 18 of the first embodiment are also provided. The lower surface edge section 21 abuts on the tapered surface 10*a* of the engagement convex section 10 at the end of the fastening operation of the plug cap 2, and is deformed to realize the area contact to seal the abutting sections. In the embodiment shown in the drawings, though the number of a lower edge section 21 is one, it is possible to use a plurality of lower edge sections 21.

In this embodiment, the seal surface 18 and the lower edge section 21 achieve double sealing. Consequently, this embodiment is preferable in sealing a liquid excellent particularly in permeability.

An embodiment shown in FIGS. 4 and 5 is one which plans for an improvement in safety in the operation and permits the user to immediately adjust a pressure inside the tank only by slightly loosening the plug cap 2 at a time when the plug cap 2 is removed in order to have the socket connected with the plug shown in FIG. 1. In other words, in some instances the liquid contained in the tank evaporates with the lapse of time. Therefore, there is a fear that an internal pressure in the tank increases in use. Due to this, it is necessary to take countermeasures against this fear or risk so as to prevent the liquid from leaking by the effects of such inner pressure in use.

One shown in FIG. 4 is one which is provided with: the edge section 23 in its upper surface; and, the surface seal section 24 in an upper section of its inner side surface, wherein the surface seal section 24 extends inward. Further, appropriate gaps 25 and 26 are provided in: between the inner side surface disposed under the surface seal section 24, and the outer side surface of the plug tube 6; and, between the outer side surface of the upper half section, and the inner bottom surface of the ring engagement section 15, respectively. In this case, the lower end corner section of the inner side surface is formed to serve as the lower end edge section 27.

In the embodiment, when the plug cap 2 is threadably engaged with the plug tube 6, the surface seal section 24 is a first one which abuts on the upper edge curved surface section 6*a* of the plug tube 6 (FIG. 4(A)). When the plug cap 2 is further threadably advanced so as to be further fastened to the plug tube 6, the seal section 24 is urged by the side surface of the plug tube 6, slightly expanded (FIG. 4(B)) and escapes into the gap 26 as shown in FIG. 4(B). Under such circumstances, the surface seal section 24 keeps on its press-contact with the outer side surface of the plug tube 6 under the influence of its restoring force. Due to this, the seal ring 1 exerts its restoring force on such section.

Then, when the plug cap 2 is further advanced threadably, the seal ring 1 has its lower end edge section 27 brought into area contact with the tapered surface 10*a* of the engagement convex section 10 after stressed and deformed to achieve sealing of such sections (FIG. 4(C)).

Under such circumstances, when the plug cap 2 is slightly loosened, the sealing operation carried out by the lower end edge section 27 ceases. At the same time, the upper end of the gas path 12 is gradually opened by the surface seal section 24. Thus, the air inside the tank is released from the tank through the gas path 12, gap 25 and the air vent hole 14 at the initial stage of threadably withdrawing operation of the plug cap 2.

An embodiment shown in FIG. 5 is smaller in size of the are contact in the surface seal section 24 than that shown in FIG. 4. In this embodiment, the surface seal section 24 is provided in the upper end section in construction, so that the gas path 12 is opened earlier than that shown in FIG. 4 in timing in operation to correspond to such construction.

An embodiment shown in FIGS. 6 and 7 is one which relates to the plug gap in the case of a gas plug provided with only a gas path in the plug tube 6. The ring engagement section 15 in this case is a groove formed in the ceiling surface in the interior of the plug cap 2. As for the seal ring 1, the ring 1 is provided with a single piece of lip 31 in its upper surface, wherein the lip 31 abuts on the edge seal surface 16 of the ring engagement section 15. Formed in the rear surface of the seal ring 1 are a plurality (two in the drawings) of lips 32 each of which abuts on the upper surface 6*c* of the plug tube 6.

In this example, a frictional resistance between two lips 32 of the rear surface and the upper surface 6*c* of the plug tube 6 is the double of a frictional resistance between a single lip 31 of the upper surface and the edge seal surface 16. Due to this, in threadably advancing the plug cap 2 with the plug tube 6, the seal ring 1 is brought into very intimate contact with the corresponding upper surface 6*c* of the plug tube 6. At the same time, the seal ring 1 is brought into light contact with the ring engagement section 15, so that the seal ring 1 is not rotated, and therefore does not follow the plug cap 2 in operation (FIG. 7(A)). Due to this, there is no fear that the upper surface of the plug tube 6 is damaged by the seal ring 1.

Further, at the end of fastening operation of the plug cap 2, both the lips 31 and 32 are deformed at the same time, and brought into area contact with the upper surface 6*c* of the plug tube 6 to seal individual abutting sections (FIG. 7(B)).

While the present invention has been described in detail to some extent with reference to the preferred embodiments thereof, it will be understood by those skilled in the art that various changes in form and details may be made therein without departing from the spirit and scope of the present invention as defined by the appended claims. In other words, the present invention is not limited in scope by its specified embodiments.

Figure 1:
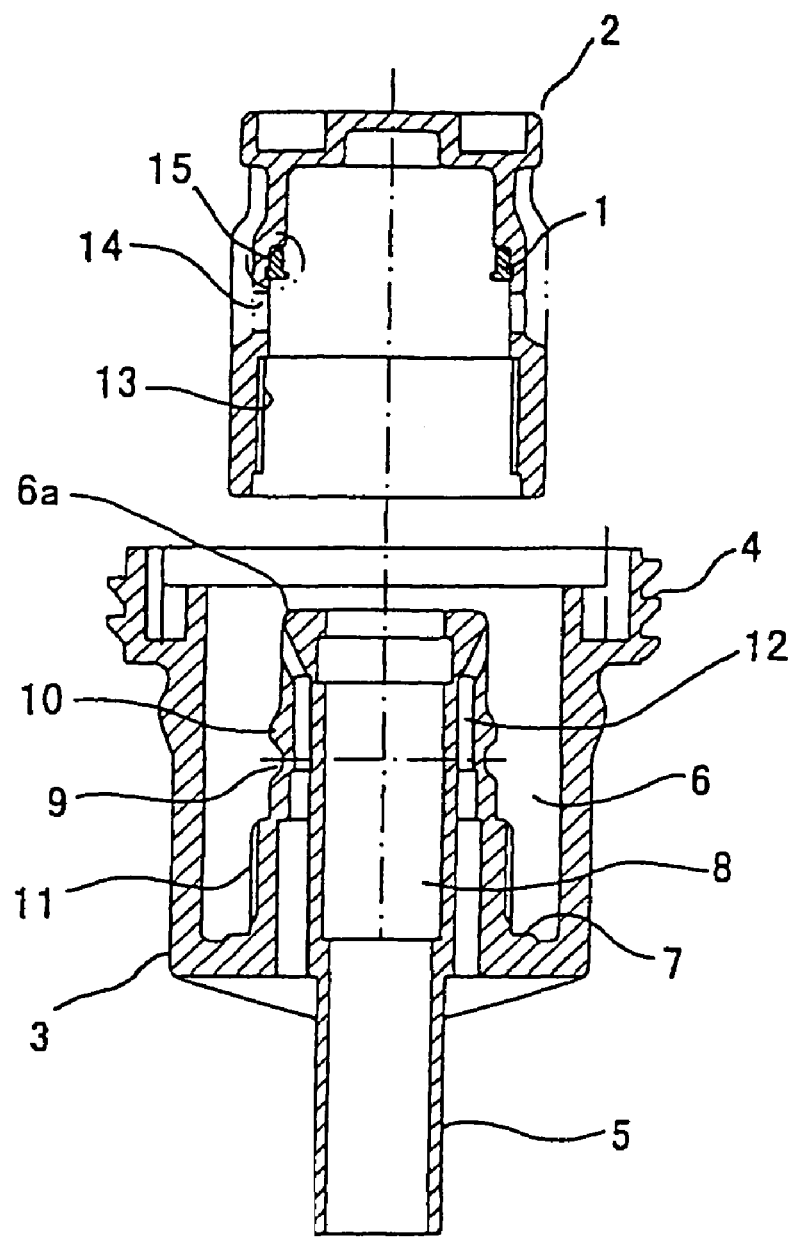
FIG. 1 is a view illustrating an example of each of: the plug cap provided with the seal ring of the present for the plug; and, the plug covered with this plug cap.
Figure 2A:
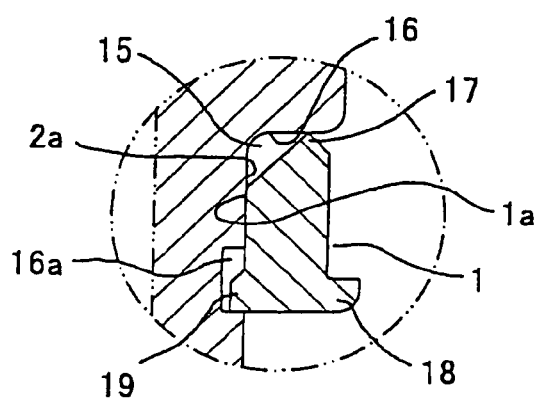
FIG. 2 is a view illustrating an example of the seal ring of the present for the plug in construction and action.
Figure 2B:
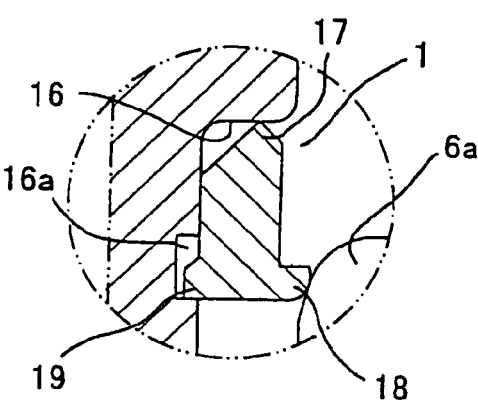
Figure 2C:
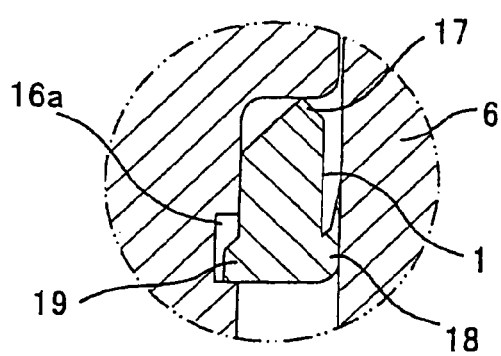
Figure 2D:
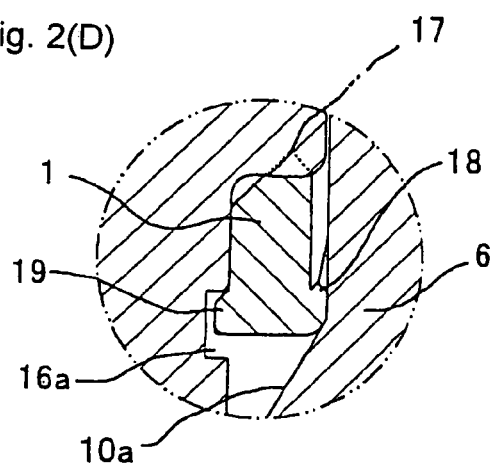
Figure 3:
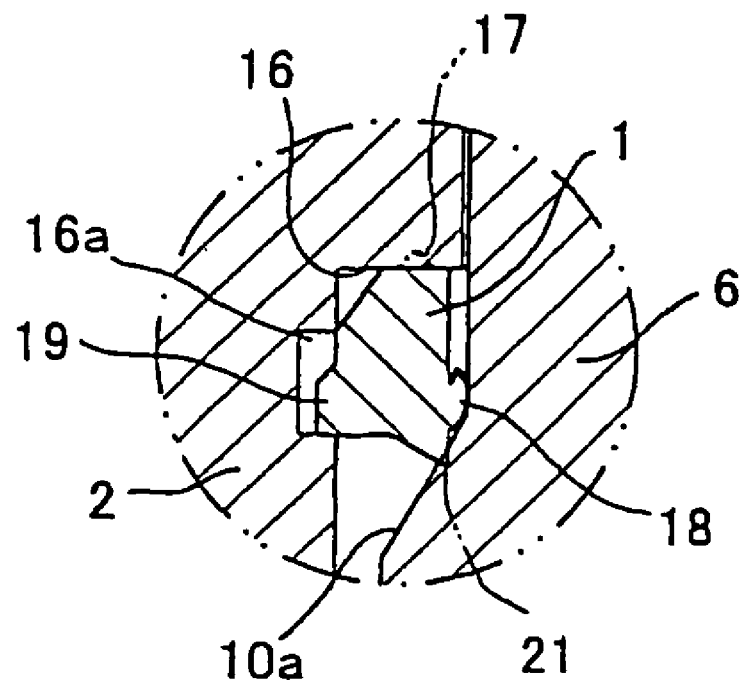
FIG. 3 is a view illustrating another example of the seal ring of the present for the plug in construction and action.
Figure 4A:
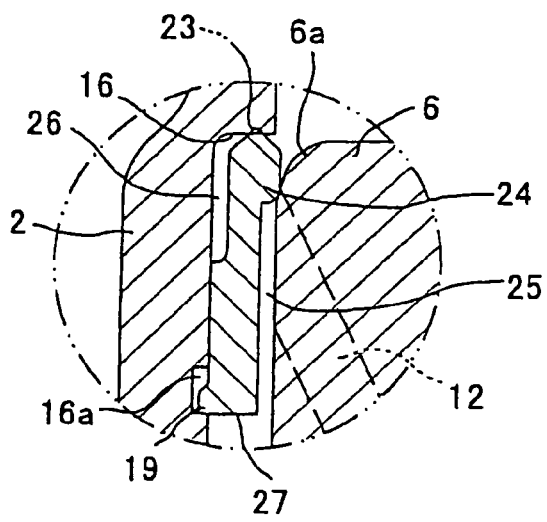
FIG. 4 is a view illustrating further another example of the seal ring of the present for the plug in construction and action.
Figure 4B:
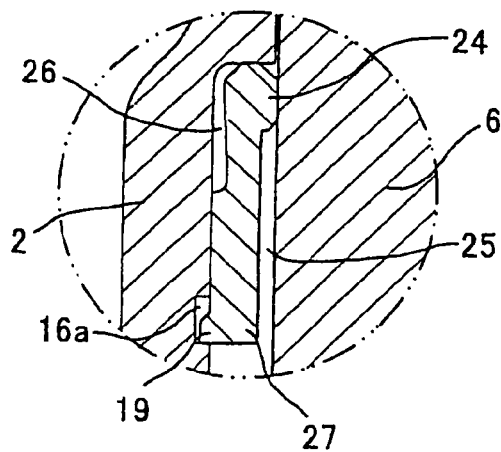
Figure 4C:
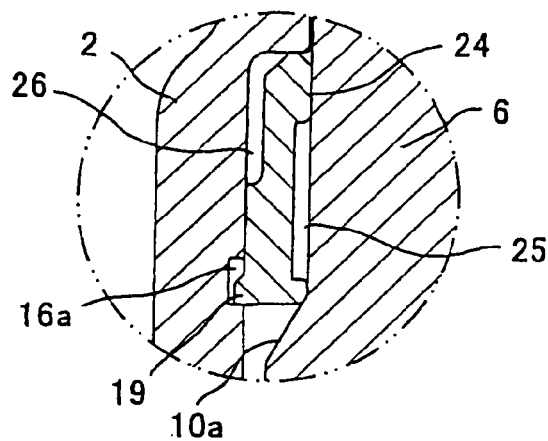
Figure 5:
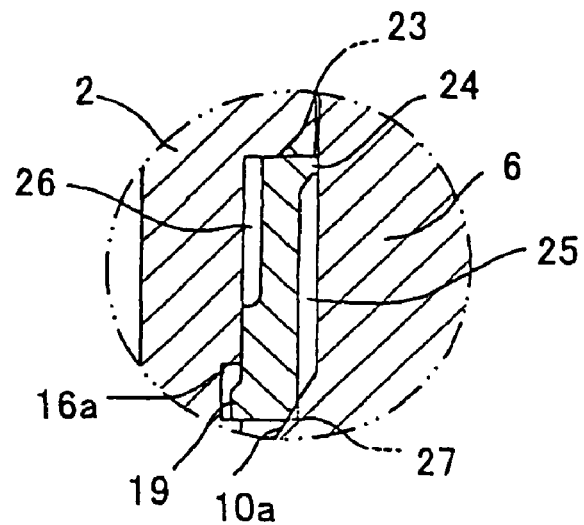
FIG. 5 is a view illustrating still further another example of the seal ring of the present for the plug in construction and action.
Figure 6:
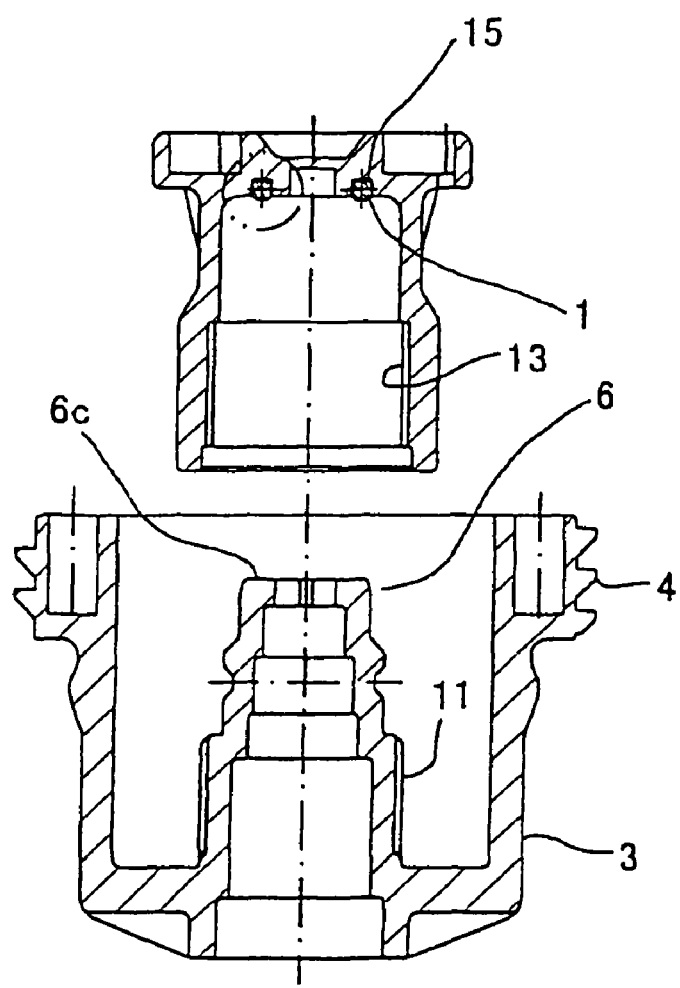
FIG. 6 is a view illustrating another example of each of: the plug cap provided with the seal ring of the present for the plug; and, the plug covered with this plug cap.
Figure 7A:
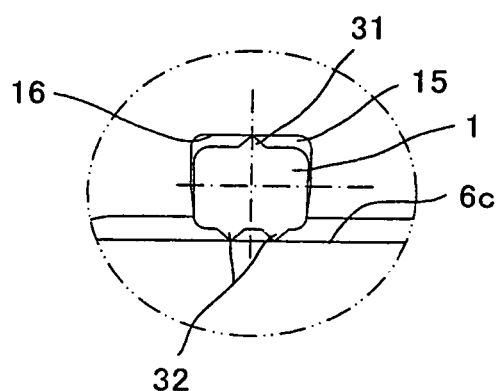
FIG. 7 is a view illustrating an example of the seal ring of the present for the plug in construction and action, where the seal ring is used in the plug cap shown in FIG. 6.
Figure 7B:
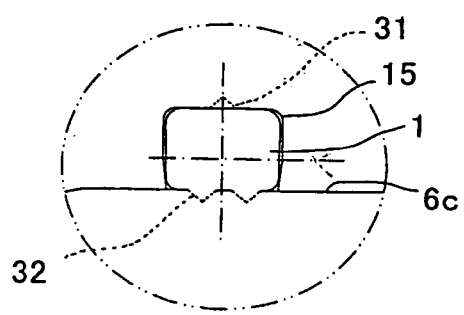
Figure 8:
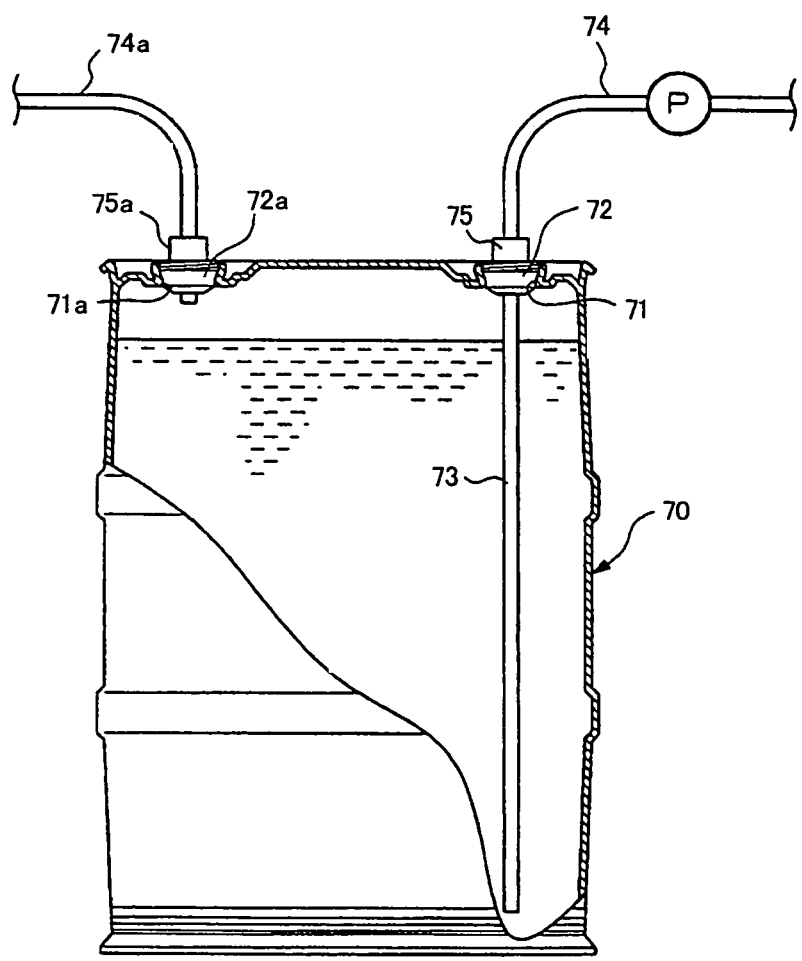
FIG. 8 is a view illustrating a conventional example of the tank for storing a chemical liquid therein.

The invention claimed is:

1. A seal ring (1) for a plug that is disposed inside a plug cap (2) which covers the plug, wherein the plug is provided with a liquid path and/or a gas path (12); and that seals fluid from the liquid path of the plug and/or fluid from the gas path (12) of the plug, comprising:
   an edge seal section (17) in an upper surface of the seal ring (1), abutting and being compressed and deformed against the plug cap (2),
   a surface seal section (18) in an inner surface of the seal ring (1), abutting against a seal surface (6, 6*a*) of the plug, and
   a projection section (19) in an outer surface of the seal ring, wherein the projection section (19) is engaged with and deformed against a ring engagement section (16*a*) formed in an inner surface of the plug cap (2).

2. The seal ring (1) for the plug as set forth in claim 1, characterized in that: an outer side surface of the seal ring (1) except the projection section (19) thereof is spaced apart from or brought into slidable contact with an inner side surface of the plug cap (2).

3. The seal ring (1) for the plug as set forth in claim 1, characterized in that: the edge seal section (17) is brought into line-contact with an edge seal surface of the ring engagement section (16); the surface seal section (18) forms a curved surface in cross section, and is brought into area contact with an outer peripheral surface of the plug to realize strain sealing.

4. The seal ring (1) for the plug as set forth in claim 3, characterized in that: a single or a plurality of edge seal sections (21) is provided in a lower side of the surface seal section (18).

5. A seal ring (1) for a plug that is disposed inside a plug cap (2) which covers the plug, wherein the plug is provided with a liquid path and/or a gas path (12); and that the seal ring (1) seals fluid from the liquid path of the plug and/or fluid from the gas path (12) of the plug, comprising:
   a surface seal section (18) in an inner side surface of the seal ring (1), abutting against a seal surface (6, 6*a*) of the plug, and
   a projection section (19) in an outer side surface of the seal ring,
   wherein the projection section is engaged with and deformed against a ring engagement section (16*a*) formed in an inner surface of the plug cap (2).

6. The seal ring (1) for the plug as set forth in claim 5, wherein the seal ring (1) is provided with an edge section (17) in its upper surface.

7. The seal ring (1) for the plug as set forth in claim 5, characterized in that an outer side surface of the seal ring (1) except the projection section (19) thereof is spaced apart from or brought into slidable contact with an inner side surface of the plug cap (2).

8. A seal ring (1) for a plug that is disposed inside a plug cap (2) which covers the plug, the plug being provided with a gas path (12), wherein the seal ring (1) seals fluid from the gas path (12) of the plug, comprising:
   a first edge section (31), having at least one lip which abuts against an edge seal (16) surface of a ring engagement (15) section formed inside the plug cap (2); and
   a second edge section (32), which abuts against a seal surface (6*c*) of the plug,
   wherein the second section (32) has a larger number of lips than the first section (31).

9. The seal ring (1) for a plug as set forth in claim 8 wherein the second edge section (32) has a plurality of lips which abut against the seal surface (6*c*) of the plug, and the second section (32) has a larger number of lips than the first section (31).

\* \* \* \* \*